United States Patent Office 2,961,388
Patented Nov. 22, 1960

2,961,388

DIMERIZATION OF TRICHLOROETHYLENE

Albert J. Blardinelli and William H. Yanko, Dayton, Ohio, assignors to Monsanto Chemical Company, St. Louis, Mo., a corporation of Delaware No Drawing. Filed July 25, 1956, Ser. No. 599,911

12 Claims. (Cl. 204—154)

This invention is directed to the dimerization of trichloroethylene under the influence of ionizing radiation.

The dimerization of olefins, particularly trichloroethylene, presents a special problem, as conditions must be found such that dimerization of the olefins is brought about, but polymerization to higher molecules does not occur to a substantial amount. In the past, trichloroethylene has been dimerized by heating, usually in the presence of a peroxide catalyst and by the use of fairly high temperatures and pressures. Such procedures often give poor yields and mixtures of products. Moreover, while such procedures are fairly suitable as batch reactions, they are not readily adaptable to continuous production because of the usual long reaction times, non-uniform performance of the catalyst over a reaction period, and the problems involved in periodically adding or regenerating catalysts.

It has now been found that the dimerization of trichloroethylene will take place under the influence of ionizing radiation, e.g., gamma-rays. The dimerization is very effectively promoted by the ionizing radiations, the reaction having a radiation yield as high as 200 to 400, and the dimer being produced with very little side product. The radiation yield, or G value, is the number of molecules reacted per 100 electron volts of absorbed radiation energy. The use of ionizing radiations has certain great advantages over catalytic methods in that the amount of the ionizing radiation can be controlled as desired, and sufficient radiation can be used to react a desired number of moles in a given reaction time. This control of the reaction time not only permits efficient use of reactor equipment and makes continuous production more practical, but it also permits selection of optimum reaction times to avoid thermal degradation or other causes for side reactions.

Trichloroethylene has been found to be especially suited for dimerization under the influence of ionizing radiations. Ionizing radiations have been found to have a much smaller or practically no dimerizing effect on some similar unsaturated materials. In some cases it is not economically feasible to use ionizing radiation for reactions having very low radiation yields or G values, as the cost of the ionizing radiation for a specific reaction is directly proportional to the G value; of course, this advantage of using ionizing radiation will depend upon the economics of the chemical system involved. It is desirable to have the G value as high as possible; for example, when the G value is over 100, the cost of the radiation will be relatively low. The G value for the dimerization of trichloroethylene is in the range of 200 to 400, depending upon the reaction conditions. Another advantage of high G values is the fact that in reactions having high G values, there is less apt to be a mixture of products.

The reaction conditions for the dimerization, i.e., temperatures, pressures, reaction times, etc., can vary considerably. Ordinarily reaction temperatures of about 60 to 130° will be used, although higher or lower temperatures, e.g., from 25 to 200° C. are also effective. One of the advantages of the use of ionizing radiations is that low temperatures of the order of 60 to 100° can be used with practical reaction times. The dimerization is preferably conducted at atmospheric pressure, although it can be conducted at higher or lower pressures, such as under vacuum, autogenous pressure, or the pressure of inert gases. Dimerization at atmospheric pressure gives good radiation yields, and is advantageous from the standpoint of cost of reactor equipment, particularly for continuous production, so ordinarily there is no reason to use higher or lower pressures. The reaction time must be sufficient for absorption of the required amount of radiation and will vary considerably depending upon the power of the radiation source.

For example, to produce 1 mole of dimer per hour in a dimerization reaction having a radiation yield of 100 requires a power input of 53.56 watt-hours, or 26.78 watt-hours for each mole of reactant. When the G value for the reaction is in the range of 200 to 400 as is the case with the dimerization of trichloroethylene, it is necessary to have an energy absorption of about 26.8 to 13.4 watt-hours for each mole of dimer formed, or 13.4 to 6.7 for each mole of trichloroethylene dimerized. While a definite amount of energy is required to dimerize a stated amount of trichloroethylene under specified conditions, it will be recognized that the required amount of energy can vary somewhat with the type of radiation and dimerization conditions; moreover, a greater or lesser amount of energy than the required amount can be supplied to the trichloroethylene reactant, depending upon whether complete or partial conversion of the trichloroethylene reactant is desired. However, it will usually be desirable to supply sufficient ionizing radiation to cause absorption in the range of 2 to 50 watt-hours for each mole of trichloroethylene present in the reaction mixture, and preferably about 5 to 25 watt-hours for each mole. It will usually be advantageous to use a radiation source of sufficient intensity to supply the desired radiation in a time of the order of one hour or less.

The ionizing radiation used in the present invention is preferably either high energy electrons or electro-magnetic radiation of high frequency not deflected by electric or magnetic fields and of great penetrative value, eg., capable of penetrating 1 millimeter of aluminum sheet, e.g., gamma-rays or X-rays. The presently preferred forms of radiation are high energy electrons and gamma-radiation. Radioactive materials, e.g., cobalt-60 are suitable sources of gamma-radiation. Cobalt-60 has a half-life of 5.3 years and emits gamma-radiation of 1.33 and 1.17 mev. (million electron volts). Another example of a suitable and convenient source of gamma-radiation for carrying out the present invention is tantalum-182, having a half-life of 117 days, and gammas of 1.22, 1.13, 0.22 and 0.15 mev. Cesium-137 is another good source which can be used. Numerous other gamma emitting radio-isotopes available from chain reacting piles and cyclotrons can also be used. Other materials providing gamma-radiation are available as naturally occurring materials, e.g., potassium-40, bismuth-214, protactinum-234, thallium-208, and lead-211. Choice of a particular source of gamma-radiation will depend upon availability, expense, intensity and the convenience of handling. Sources having an intensity from below 50 millicuries up to, for example, 10 kilocuries, can be conveniently handled with proper facilities. However, in order to react a substantial amount of material in a reasonably short reaction time, a source of at least about 50 curies should be used, and it is desirable to employ a source of 1 or 2 kilocuries or more. It is possible, of course, to use several sources situated at different positions in a reaction system. Green fuel elements from an atomic pile make a convenient source of gamma-radiation; green fuel elements are made up of fissionable material charged to the atomic pile, e.g., uranium-235, having associated therewith various fission products which are highly radioactive; such green fuel elements are normally stored for some time, e.g., one to six months, before chemical processing is attempted. The radiation energy being emitted during such a time is normally wasted, and can be used to advantage in the present invention. The dimerizations of the present invention can, if desired, be effected in an atomic pile, the location in the pile being selected to give the desired type and intensity of radiation.

Another suitable type of radiation for use in accordance with this invention is X-rays. X-rays are particularly adapted to reactions conducted at atmospheric pressure, as a metallic target could be placed in the reaction mixture and bombarded with electrons, thereby causing the X-rays to be emitted from a source within the reaction mixture. Another very suitable procedure is radiation with $\beta$-particles or other high energy electrons, such as electrons of around 0.05 to 15 mev. energy. Such electrons can be supplied by a Van de Graaff generator, linear accelerator, or other type generator.

While we consider that the employment of radiation with $\alpha$-particles, mesons and neutrons is within the purview of our invention, these radiations are presently considered to be less preferred than gamma- or X-ray radiation or radiation with high energy electrons. The selection of a suitable radiation system is within the skill of the art. It is only necessary to have sufficient radiation energy absorbed to convert a given number of moles in a stated reaction time, and the required energy can be readily calculated from the G value for the reaction. In continuous systems it may be advantageous to permit only about 50% of the required energy to be absorbed per cycle, and to separate the dimer product and recycle the trichloroethylene reactant.

The high energy ionizing radiations used in the present invention are of a different character than ultraviolet light which has been used in the past to induce certain chemical reactions. The majority of ultraviolet light photons from a mercury ultraviolet lamp have an energy value of 4.89 E.V., while the particles or rays of radiation applied in the present invention have energy values much greater than 5 E.V., being at least greater than 10 E.V., and usually of the order of a 0.25 million electron volts to 2.5 million electron volts or more.

Our dimerization reaction can be conducted in the presence of a solvent, e.g., an organic solvent such as a halogenated hydrocarbon, or in the absence of solvent. It is preferred that the dimerization be conducted in carbon tetrachloride as an organic solvent. Other solvents which can be used are tetrachlorethane, chloroform, etc., and hydrocarbon solvents such as n-hexane, cyclohexane, n-octane, etc.

The following examples illustrate certain specific embodiments of the present invention:

*Example 1*

To a stainless steel autoclave, 138.3 grams (86.7 ml.) of carbon tetrachloride, and 118.2 grams (80.7 ml.) of trichloroethylene were charged. A 50 curie cobalt-60 source of gamma radiation, which provided a dosage of 70,000 roentgens per hour, was raised into a well in the stainless steel autoclave reactor, and the reactor was heated to about 120° C. for about 88 hours. A black carbonaceous material, 3.7 grams, was filtered from the reaction mixture and the reaction mixture was then distilled through a 2 ft. glass helices-packed column. After the low boiling materials, in an amount of 136.2 grams, including carbon tetrachloride and unreacted trichloroethylene, were distilled off, 31.7 grams of trichloroethylene dimer was distilled at 84–88°/3 mm. and had a refractive index, $n_D^{25}$ 1.5429. There was a residue of 9.2 grams. The total weight of material recovered from the reaction mixture was 177 grams. The conversion to trichloroethylene dimer based upon the moles of trichloroethylene charged was 26.8%. The total radiation dose during this reaction was $6.16 \times 10^6$ roentgens, and the G value for the reaction was 254. The analysis for the trichloroethylene dimer was—

Calc'd. for $C_4H_2Cl_6$: C, 18.28; H, 0.76; Cl, 80.95. Found: C, 18.63; H, 1.37; Cl. 80.50.

The G value, based on trichloroethylene dimerized was calculated by dividing the molecules of trichloroethylene dimerized by the total radiation (in 100 E.V. units):

$$G = \frac{6.023 \times 10^{23} \times \frac{31.7}{131.4}}{6.16 \times 10^6 \times 5.24 \times 10^{11} \times 177} = 254$$

The radiation dosage resulting from use of the 50 curie Co-60 source in the above reactor was determined by a standard dosimeter test which measured the amount of ferrous ion oxidized to ferric ion under controlled oxidizing conditions in a given volume of solution in the reactor under the influence of the Co-60 source for a specified time.

*Example 2*

To a glass lined reactor 2200 grams of trichloroethylene was charged. A 50 curie source of cobalt-60 was raised into a well in the center of the reactor, and the trichloroethylene material was refluxed for 42.5 hours at 86 to 87° C. The total average radiation dose was $1.022 \times 10^6$ roentgens. The orange-red reaction mixture, 2148 grams, was distilled to give 52.6 grams of trichloroethylene dimer at 86–90°/3 mm., and 2059.7 grams of recovered trichloroethylene. The G value for the reaction was 210.

The dimer product is probably a mixture of three isomers:

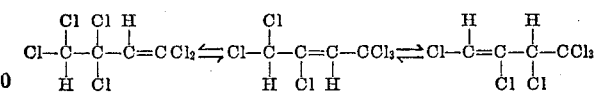

*Example 3*

A mixture of 1230 grams of carbon tetrachloride and 1059 grams of trichloroethylene was charged to a glass reactor and placed in a radiation chamber. The reaction mixture was heated to reflux for 90 hours to cause formation of the trichloroethylene dimer. The total radiation dosage was $1.8 \times 10^6$ roentgens. The G value for the reaction was 398, and the bulk of the product was the desired dimer, the amount of higher polymer formed amounting to only 7.7% of the trichloroethylene dimer product.

*Example 4*

A mixture of 385 cc. of carbon tetrachloride and 4 moles of trichloroethylene was charged to a 1 liter flask equipped with a condenser, and the mixture was refluxed for 91 hours in the absence of radiation. Upon distillation, only 0.97 gram of product was obtained as a thick dark oil.

The fact that heat alone in Example 4 caused only a negligible amount of dimerization, while under the same conditions but with ionizing radiation there is substantial dimerization, shows that the ionizing radiation is causing the dimerization. The reactor used for the closed-system dimerization reactions of the present invention was a stainless steel bomb of about 2 inches internal diameter and 250 cc. capacity. The bomb was fitted with a $\frac{5}{16}$ inch inside diameter well, made of high pressure tubing, which passed through the center of the bottom closure and extended into the middle of the reaction space. The purpose of the well was to permit the cobalt-60 to be surrounded by materials being subjected to gamma-radiation. The cobalt-60 employed was a 50-curie source. The cobalt-60 was in the form of a ¼ inch wire 5 inches long and encased in a capsule which could be run in or out of the reactor well by remote control. The glass reactor used for the reactions at reflux was 4 inches in diameter and had a volume of about 2500 cc., and had a well similar to that of the stainless steel bomb.

*Example 5*

To a reactor were charged 77 grams of carbon-tetrachloride and 65.7 grams of trichloroethylene. As a source of β-radiation, a 200 millicurie strontium-90 source enclosed in a 5 mm. glass tube with 0.5 mm. walls was used. The reaction mixture was refluxed for a total of 25 hours while receiving a total radiation dosage of 50,400 roentgens. The reaction mixture was distilled through a packed column, and the distillation flask was then heated under vacuum to remove the last traces of trichloroethylene. A small residue of trichloroethylene dimer remained in the distillation flask, indicating that even a weak source of β-rays had a catalytic effect upon the dimerization. The G value for the reaction was 420.

While no catalyst (other than the ionizing radiation) is required in the process of the present invention, catalysts, e.g., peroxide catalysts such as benzoyl peroxide, can be used, and the presence of such catalysts may be advantageous under some circumstances. Similarly, short-stopping agents or antioxidants, e.g., pyridine, can be present in the reaction mixture, although their presence is not necessary.

As trichloroethylene dimer is a valuable organic intermediate and solvent, an efficient and controlled method of producing this dimer has great utility.

While the above description is particularly directed to the dimerization of trichloroethylene, there are other olefinic compounds which will similarly be subject to dimerization under the influence of ionizing radiation, as will be apparent to those skilled in the art. Such olefinic compounds will generally conform to the formula:

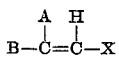

in which each of A, B and X can represent —Cl, —F, —Br, —I, —SO₃H, —Cn, etc., or an organic radical, and in which either A or B can also represent —H.

A method of dimerizing trichloroethylene under the influence of ionizing radiation has been described.

What we claim is:

1. A process of dimerizing trichloroethylene which comprises subjecting trichloroethylene to the influence of high energy ionizing radiation having energies of at least 10 electron volts for a time sufficient to effect the desired dimerization.

2. A process of dimerizing trichloroethylene which comprises heating trichloroethylene to 50° C. to 200° C. in the presence of an applied ionizing radiation of energies of 0.05 to 15 mev. for a time sufficient to effect the desired dimerization.

3. A process of dimerizing trichloroethylene which comprises heating trichloroethylene in an organic solvent under the influence of high energy electron radiation having energies of at least 10 electron volts for a time sufficient to effect the desired dimerization.

4. A process of dimerizing trichloroethylene which comprises heating trichloroethylene in an organic solvent under the influence of high energy X-ray radiation for a time sufficient to effect the desired dimerization.

5. A process for dimerizing trichloroethylene which comprises heating trichloroethylene in an organic solvent under the influence of high energy gamma rays for a time sufficient to effect the desired dimerization.

6. A process of preparing trichloroethylene dimer which comprises heating trichloroethylene in carbon tetrachloride under the influence of high energy ionizing radiation having energies of at least 10 electron volts for a time sufficient to effect the desired dimerization.

7. The process of claim 1 in which the ionizing radiation is gamma-radiation.

8. A method of dimerizing trichloroethylene which comprises heating trichloroethylene under the influence of an applied ionizing radiation of energies of the order of 0.25 to 2.5 mev. absorbed to the extent of about 5 to 25 watt-hours for each gram-mole of trichloroethylene.

9. A method of dimerizing trichloroethylene which comprises heating trichloroethylene to 60 to 130° C. under the influence of an absorbed gamma radiation of about 13.4 to 6.7 watt-hours for each gram-mole of trichloroethylene.

10. A method of dimerizing trichloroethylene which comprises heating trichloroethylene to 60 to 130° C. under the influence of an absorbed high energy electron radiation of about 13.4 to 6.7 watt-hours for each gram-mole of trichloroethylene.

11. A method of dimerizing trichloroethylene which comprises heating trichloroethylene to 60 to 130° C. under the influence of an absorbed X-ray radiation of about 13.4 to 6.7 watt-hours for each gram-mole of trichloroethylene.

12. The process in claim 1 in which the trichloroethylene is irradiated with high energy electrons.

References Cited in the file of this patent

UNITED STATES PATENTS

| | | |
|---|---|---|
| 2,865,824 | Borland et al. | Dec. 23, 1958 |
| 2,865,825 | Jacobowsky et al. | Dec. 23, 1958 |

FOREIGN PATENTS

| | | |
|---|---|---|
| 714,843 | Great Britain | Sept. 1, 1954 |
| 64,192 | France | May 18, 1955 |
| | (2nd addition to No. 1,079,401) | |
| 1,121,084 | France | Apr. 30, 1956 |

OTHER REFERENCES

Brookhaven National Laboratory Report No. 294, pages 8–10, March 1954.